United States Patent
Fisher et al.

(10) Patent No.: US 10,027,181 B2
(45) Date of Patent: Jul. 17, 2018

(54) LAYERS OF SAFETY AND FAILSAFE CAPABILITY FOR OPERATION OF CLASS IV LASER IN CONSUMER ELECTRONICS DEVICES

(71) Applicant: X-Celeprint Limited, Cork (IE)

(72) Inventors: Brent Fisher, Durham, NC (US); Brian Cox, Durham, NC (US); Matthew Meitl, Durham, NC (US); Scott Burroughs, Raleigh, NC (US); Joseph Carr, Chapel Hill, NC (US)

(73) Assignee: X-Celeprint Limited, Cork (IE)

( * ) Notice: Subject to any disclaimer, the term of this patent is extended or adjusted under 35 U.S.C. 154(b) by 170 days.

(21) Appl. No.: 15/280,584

(22) Filed: Sep. 29, 2016

(65) Prior Publication Data
US 2017/0093228 A1 Mar. 30, 2017

Related U.S. Application Data

(60) Provisional application No. 62/234,324, filed on Sep. 29, 2015.

(51) Int. Cl.
*H02J 50/30* (2016.01)
*H02J 7/02* (2016.01)
*H02J 7/35* (2006.01)

(52) U.S. Cl.
CPC .............. *H02J 50/30* (2016.02); *H02J 7/025* (2013.01); *H02J 7/35* (2013.01); *Y02E 10/566* (2013.01)

(58) Field of Classification Search
CPC ... H02J 50/30; H02J 7/025; H02J 7/35; Y02E 10/566
See application file for complete search history.

(56) References Cited

U.S. PATENT DOCUMENTS

| | | | |
|---|---|---|---|
| 7,514,899 | B2 | 4/2009 | Deng-Peng |
| 2015/0295114 | A1 | 10/2015 | Meitl et al. |
| 2017/0018675 | A1 | 1/2017 | Meitl et al. |
| 2017/0093501 | A1 | 3/2017 | Meitl et al. |
| 2017/0114967 | A1 | 4/2017 | Chen |

OTHER PUBLICATIONS

International Search Report, PCT/US2016/054447 (Layers of Safety & Failsafe Capability for Operation of Class IV Laser in Consumer Electronics Devices, filed Sep. 29, 2016), issued by ISA/KR, 3 pages, dated Dec. 14, 2016.
Written Opinion, PCT/US2016/054447 (Layers of Safety & Failsafe Capability for Operation of Class IV Laser in Consumer Electronics Devices, filed Sep. 29, 2016), issued by ISA/KR, 7 pages, dated Dec. 14, 2016.

*Primary Examiner* — Robert Deberadinis
(74) *Attorney, Agent, or Firm* — William R. Haulbrook; Bin Li; Choate, Hall & Stewart LLP (57) ABSTRACT

An optical power transfer device includes a transmitter circuit, including a laser light source that is configured to emit coherent light responsive to operation above a lasing threshold, and is configured to emit incoherent light responsive operation below the lasing threshold. A proximity sensor circuit is coupled to the transmitter circuit and is configured to output a detection signal therefrom responsive to authentication of an optical receiver including at least one photovoltaic cell having surface area of about 4 square millimeters or less within a proximity thereof. The transmitter circuit is configured to operate the laser light source below the lasing threshold to emit the incoherent light responsive to an absence of the detection signal from the proximity sensor circuit. Related devices and methods of operation are also discussed.

20 Claims, 6 Drawing Sheets

DETECTION SIGNAL

FIGURE 1C

ABSENCE OF DETECTION SIGNAL

LAYERS OF SAFETY AND FAILSAFE CAPABILITY FOR OPERATION OF CLASS IV LASER IN CONSUMER ELECTRONICS DEVICES

CLAIM OF PRIORITY

This application claims priority from U.S. Provisional Patent Application No. 62/234,324 entitled "LAYERS OF SAFETY & FAILSAFE CAPABILITY FOR OPERATION OF CLASS IV LASER IN CONSUMER ELECTRONICS DEVICES", filed Sep. 29, 2015, in the United States Patent and Trademark Office, the disclosure of which is incorporated by reference herein in its entirety.

RELATED APPLICATION

This application is related to U.S. patent application Ser. No. 14/683,498, entitled "MULTI-JUNCTION POWER CONVERTER WITH PHOTON RECYCLING", filed Apr. 10, 2015, and U.S. Provisional Patent Application Ser. No. 62/234,305 entitled "MULTI-JUNCTION PHOTOVOLTAIC MICRO-CELL ARCHITECTURES FOR ENERGY HARVESTING AND/OR LASER POWER CONVERSION", filed Sep. 29, 2015, in the United States Patent and Trademark Office, the disclosures of which are incorporated by reference herein in their entireties. This application is also related to U.S. Provisional Patent Application Ser. No. 62/234,302 entitled "MINIATURIZED DEVICES FOR COMBINED OPTICAL POWER CONVERSION AND DATA TRANSMISSION", filed Sep. 29, 2015, in the United States Patent and Trademark Office, the disclosure of which is incorporated by reference herein in its entirety.

FIELD

The present disclosure relates to laser operation and safety in devices incorporating laser operation.

BACKGROUND

Portable electronic devices, such as mobile cellular telephones, personal digital assistants (PDA's), digital cameras, portable audio/video devices, etc., are powered by electrical batteries, which are typically rechargeable. However, many devices use custom-sized batteries that are not removed from the electronic device for charging. For these devices, dedicated chargers are used; but as different brands and/or types of portable devices may have different charging ports, different chargers may be required. Moreover, as the physical dimensions of the portable devices are miniaturized, and/or as operation in harsh or wet environments is desired, physical contacts of the charging terminals may become increasingly difficult to implement.

Some approaches to address the above and other problems may eliminate the use of wire-based charging ports, for example, optical charging or inductive charging. In inductive charging, an inductive coupling (magnetic field interaction) may be used to provide a wireless coupling to the portable device. For example, a charging pad may include a number of electrical coils that carry an electrical current. The portable device may also contain an electrical coil. When the portable device is placed on the charging pad, an electrical current is induced in the coil of the portable device; this current is used to charge the battery.

While inductive charging may offer several advantages, disadvantages may include interference of the electromagnetic field with other electronic devices, and a lower practical limit in terms of the size of the coil and corresponding device. Also, the use of inductive coupling may limit the choice of materials for the portable device housing.

Optical charging, in which radiation in the visible or infrared (IR) region of the spectrum may be transmitted to a photovoltaic cell or other receiver in a portable device, may avoid some of these drawbacks. However, optical charging may face other challenges, for example, conversion efficiency, atmospheric absorption, and hazards presented by laser radiation.

SUMMARY

Embodiments described herein may be applied in a number of overlapping specific fields, including but not limited to laser safety, wireless charging technology for consumer electronics, energy transfer or transmission devices, and/or wearables and Internet of Things (IoT) electronics.

According to some embodiments, an optical power transfer device includes a transmitter circuit including a laser light source that is configured to emit coherent light when operated above a lasing threshold, and to emit incoherent light when operated below the lasing threshold. A proximity sensor circuit is coupled to the transmitter circuit and is configured to output a detection signal indicative of an optical receiver within a proximity thereof. The optical receiver includes at least one photovoltaic cell having surface area of about 4 square millimeters (mm) or less that is configured to generate electric current in response to illumination by the coherent light. The transmitter circuit is configured to operate the laser light source below the lasing threshold to emit the incoherent light in response to an absence of the detection signal from the proximity sensor circuit.

In some embodiments, the transmitter circuit may be configured to operate the laser light source at a low-power or no-power state until receipt of the detection signal, to prevent coherent light output from the laser light source responsive to an absence of the detection signal. The transmitter circuit may be further configured to operate the light source at a high-power state responsive to receipt of the detection signal from the proximity sensor circuit.

In some embodiments, the proximity sensor circuit may be configured to receive a feedback signal from the optical receiver responsive to operation of the laser light source to emit the incoherent light.

In some embodiments, the proximity sensor circuit may be configured to perform authentication of the optical receiver responsive to receipt of the feedback signal and prior to output of the detection signal.

In some embodiments, the feedback signal may be an optical signal. The proximity sensor circuit may include an optical detector that is configured to detect temporal and/or spectral encoding in the optical signal, and the proximity sensor circuit may be configured to perform the authentication of the optical receiver based on the temporal and/or spectral encoding in the optical signal.

In some embodiments, the proximity sensor circuit may further include an optical emitter configured to emit an optical proximity signal, and the feedback signal may be a reflection of the optical proximity signal. In further embodiments, the feedback signal may be a reflection of the incoherent light. In some embodiments, the reflection may be from an interference reflector, microspheres, and/or holograms in the optical receiver.

In some embodiments, the coherent light may have a full lasing output power of about 500 milliwatts or more. The transmitter circuit may be configured to operate the laser light source above the lasing threshold but below the full lasing output power to emit lower-power coherent light upon expiration of a time delay after receiving the feedback signal. As such, the transmitter circuit may be configured to operate the laser light source to delay turn-on until specified safety conditions for laser emission have been met.

In some embodiments, the proximity sensor circuit may be configured to receive an authentication response signal from the optical receiver responsive to operation of the laser light source to emit the lower-power coherent light. The proximity sensor circuit may be further configured to perform authentication of the optical receiver responsive to receipt of the authentication response signal.

In some embodiments, the incoherent light or the lower-power coherent light may be configured to energize the optical receiver to generate the feedback signal or the authentication response signal, respectively. For example, the lower-power coherent light emitted from the laser light source during a ramp-up period may be insufficient to charge another device (such as a portable consumer electronic device) coupled to the optical receiver, but may be sufficient to energize a device in the optical receiver to provide the authentication response signal. As such, the transmitter circuit may be configured to operate the light source to slow turn-on or otherwise ramp power slowly based on feedback from receiver, and may require further authentication to indicate "all clear" to further increase power.

In some embodiments, the feedback signal may be a first feedback signal, and the proximity sensor circuit may further include additional types of proximity sensors configured to detect one or more additional feedback signals.

In some embodiments the proximity sensor circuit may further include a magnetic sensor configured to detect a magnetic field component of a second feedback signal from the optical sensor, and the proximity sensor circuit may be further configured to perform the authentication of the optical receiver responsive to receipt of the first feedback signal and the second feedback signal. In some embodiments, the second feedback signal may include a sequence of magnetic pole orientations corresponding to magnetic dipoles within the optical receiver.

In some embodiments, the proximity sensor circuit may further include a wireless radio-frequency receiver (such as an RFID receiver), the second feedback signal may be a wireless radio-frequency signal, and the proximity sensor circuit may be configured to perform the authentication of the optical receiver responsive to receipt of the wireless radio-frequency signal at the wireless radio-frequency receiver.

In some embodiments, the proximity sensor circuit may further include a temperature sensor configured to detect the proximity of the optical receiver.

In some embodiments, a transmitter housing may include the transmitter circuit and the proximity sensor circuit therein. The transmitter housing may further include an aperture including the laser light source therein, and a lens element within the aperture and optically coupled to the laser light source. A focal point of the lens element may be within the transmitter housing.

In some embodiments, the lens element may be configured to provide divergence beyond the focal point such that, responsive to operation of the laser light source to emit the coherent light, an intensity of the coherent light decreases with distance from the aperture.

In some embodiments, the transmitter housing may include at least one structure that is configured to position the transmitter housing at a desired orientation relative to a receiver housing comprising the optical receiver, and the desired orientation may position the proximity sensor circuit to receive the feedback signal.

In some embodiments, the proximity sensor circuit may be further configured to perform the authentication based detection of the desired orientation of the transmitter housing relative to the receiver housing.

In some embodiments, the transmitter and receiver housings may include respective physical keying, latching, and/or positioning mechanisms, which force a physical barrier to latch into a particular physical position, where the physical barrier blocks the output of the laser light source when the transmitter and receiver housings are not positioned or aligned in the desired orientation.

In some embodiments, the coherent light may have a wavelength of about 1400 nm to about 1700 nm and higher, and/or may have a temporal profile configured to provide continuous radiation. That is, the laser light source may be configured to emit light in a wavelength range that may be less damaging to the human eye, and/or to emit light in a continuous (rather than pulsed) manner that may reduce thermal damage to a human tissue.

In some embodiments, the transmitter circuit may be configured to operate the laser light source to immediately turn-off of laser emission responsive to an absence of any one of a plurality of detection signals during operation of the laser light source to emit coherent light (e.g., when even a single safety condition has been violated).

In some embodiments, the at least one photovoltaic cell may be a stack of photovoltaic cells that collectively provide a voltage that is greater than a photon energy of the illumination by the coherent light that is incident on one of the photovoltaic cells in the stack.

In some embodiments, the optical receiver may include one or more InGaAsSb photovoltaic cells that are configured to provide a desired output voltage based on the wavelength of the coherent light provided by the laser light source.

In some embodiments, the coherent light may include a modulated optical signal, the optical receiver further may include a photoconductive diode electrically connected to the at least one photovoltaic cell, and the photoconductive diode may be configured to generate a data signal in response to the illumination by the coherent light comprising the modulated optical signal and application of a reverse bias voltage thereto.

According to further embodiments, in a method of operating an optical power transfer device, a presence or absence of a detection signal output from a proximity sensor circuit may be detected at a transmitter circuit comprising a laser light source configured to emit coherent light having an output power that presents danger of injury to a human (e.g., greater than about 10 mW, depending on wavelength). In some embodiments, the output power may be about 500 milliwatts (mW) or more. The detection signal indicates an optical receiver comprising at least one photovoltaic cell having surface area of about 4 square millimeters ($mm^2$) or less within a proximity thereof. The laser light source is operated below a lasing threshold thereof to emit incoherent light therefrom responsive to detecting the absence of the detection signal from the proximity sensor circuit.

In some embodiments, a feedback signal from the optical receiver may be received at the proximity sensor circuit responsive to operating the laser light source to emit the incoherent light.

In some embodiments, authentication of the optical receiver may be performed at the proximity sensor circuit responsive to receiving the feedback signal and prior to output of the detection signal.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION OF EMBODIMENTS

The present disclosure encompasses numerous embodiments which can be applied to consumer electronics devices (including for example, wearable devices) that use a Class IV or higher laser. The emissions of such a laser can present danger to a human being (for example, eye damage). Embodiments of the present disclosure can provide protection against the possibility of the laser emitting temporally coherent radiation (i.e. lasing) whenever a human is exposed to the output coupler (i.e., the emitting end) of the laser. In particular, such embodiments enable many automated or semi-automated functionalities, which (individually or in combination) can reduce or prevent the laser from emitting coherent light whenever the output is exposed. These functionalities include, but are not limited to:

Delayed turn-on when specified safety conditions for laser emission have been met;

Slow turn-on—to ramp power only slowly with feedback from receiver to indicate "all clear" to increase power further;

Immediate turn-off of laser emission (or reduction in current to subthreshold level) when one or more safety conditions has been violated;

Use of proximity sensors to detect a presence and/or orientation of a known physical barrier, shutter, or other component of a receiver before the laser radiation is permitted to turn-on. The physical barrier includes any structure that is configured to reduce or prevent laser radiation from propagating into the environment and potentially contacting humans;

Use of methods to authenticate the identity of the receiver and/or physical barrier that reduces or prevents laser radiation from propagating into the environment. Such authentication can reduce or prevent accidental enabling of the laser in the presence of non-authenticated, would-be barriers and/or deliberate spoofing (over-riding) of the safety mechanism;

Employment of physical keying, latching, and/or positioning mechanisms which force the physical barrier to latch into a particular position or orientation that increases or maximizes safety and may also improve or optimize overall device performance;

Use of visible indicators to inform user when laser radiation is turned-on;

Emission of laser radiation from the transmitter that has less dangerous characteristics, including (but not limited to) a highly diverging field such that laser intensity (watts per square meter ($W/m^2$)) is reduced by more than 1/R (where R is the distance of the observer from the aperture), a wavelength for which the human eye is less sensitive and therefore subject to a lower risk of eye damage (e.g., infrared wavelengths beyond 1400 nm instead of 550 nm), and/or a temporal profile of the laser radiation which may enhance safety (e.g. use of continuous rather than pulsed radiation in a manner that may reduce thermal damage in a human).

Figure 1A:
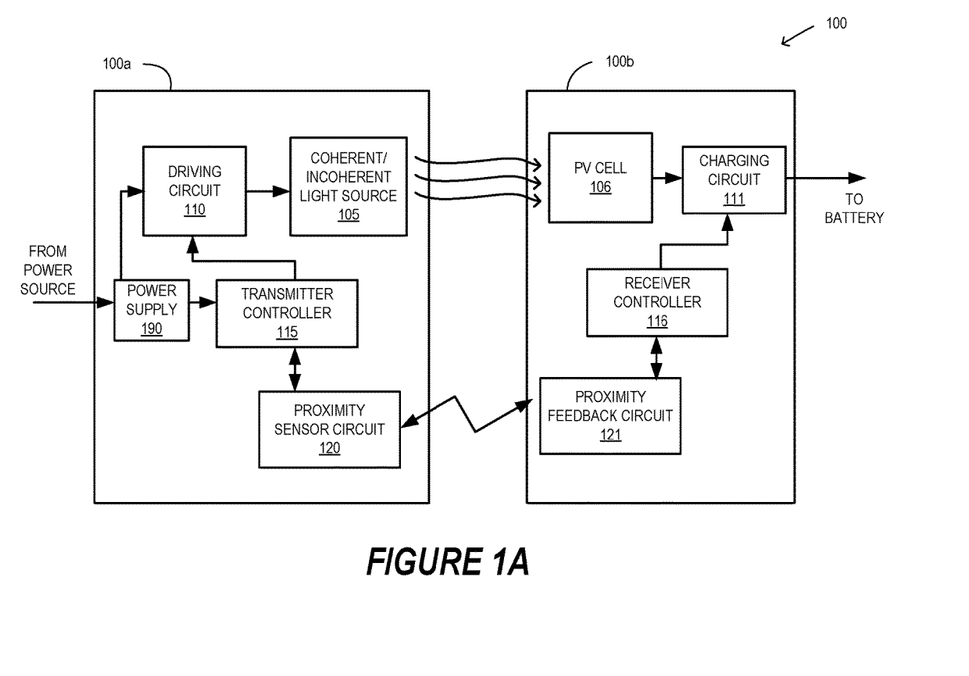
FIGS. 1A-1C are a diagrams of a transmitter, a receiver, and a light source of an optical power transfer device including safety features in accordance with some embodiments of the present disclosure.
Figure 1B:
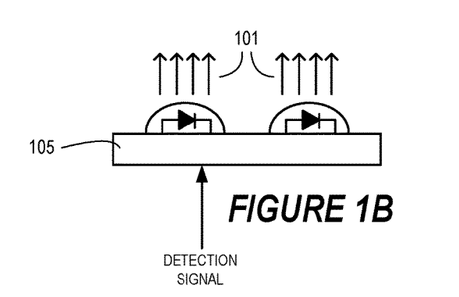
Figure 1C:
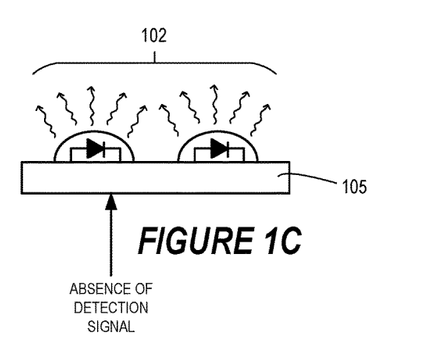

FIG. 1A illustrates a transmitter portion 100a and a receiver portion 100b of an optical power transfer device 100 in accordance with some embodiments of the present disclosure that implements one or more of the different laser safety functionalities described herein. In the embodiment of FIG. 1A, the transmitter 100a includes a light source 105 that is operable to emit coherent light 101 in response to a current above a lasing threshold as shown in FIG. 1B, and is operable to emit incoherent light 102 in response to a current below the lasing threshold (referred to herein as a subthreshold current) as shown in FIG. 1C. The terms coherent and incoherent with respect to the light 101 and 102 output from the light source 105 may refer to temporal coherence and temporal incoherence, respectively. The coherent light 101 and/or the incoherent light 102 may be monochromatic in some embodiments. The transmitter 100a further includes a driving circuit 110 that is configured to provide the current to the light source 105 in response to a signal from a transmitter controller 115. The transmitter controller 115 is configured to operate the driving circuit 110 in response to a detection signal generated by a proximity sensor circuit 120, which is configured to generate the detection signal in response to authentication of the receiver 100b. The transmitter controller 115 may be a microprocessor device or other microcontroller that is configured to control operation of the driving circuit 110 and/or light source 105, which may be collectively referred to herein as a transmitter circuit. The transmitter 100a of the optical power transfer device 100 is powered by a power supply 190, which receives power from an external source.

The transmitter circuit may operate the light source 105 to emit coherent light 101 having an output power of about 500 milliwatts (mW) or more at a desired wavelength, in response to the presence and authentication of the receiver 100b by the transmitter circuit. In some embodiments, the light source 105 may be operated according to a temporal profile such that the coherent light 102 provides continuous (rather than pulsed) radiation, and/or at a wavelength of about 1400 nm to about 1700 nm or more, to reduce thermal damage to human tissue. In the absence or failure to authenticate the receiver 100b, the transmitter circuit may otherwise operate the light source 105 to emit incoherent light

102. For example, the light source 105 may be operated to continuously or intermittently emit incoherent light 102 in the absence or failure to authenticate the receiver 100b in some embodiments.

Still referring to FIG. 1A, the receiver 100b includes one or more photovoltaic cells 106 having a structure (e.g., stacked), arrangement (e.g., arrayed), and/or material composition (e.g., semiconductor bandgap) such that the photovoltaic cells 106 are configured to generate electrical current or power responsive to illumination by the coherent light. The photovoltaic cell(s) 106 may have surface areas of about 4 square millimeters ($mm^2$) or less, which may be microtransfer printed onto the receiver substrate, allowing for the receiver 100b to have a compact size and/or footprint. In some embodiments, the photovoltaic cells 106 may be multi-junction cells in a stacked configuration, such as those described in U.S. patent application Ser. No. 14/683,498, filed Apr. 10, 2015, and U.S. Provisional Patent Application Ser. No. 62/234,305 filed Sep. 29, 2015, the disclosures of which are incorporated by reference herein in their entireties. Additionally or alternatively, the photovoltaic cells 106 may be configured to provide both power and data transfer in response to illumination by a modulated optical signal from the light source 105. For example, the photovoltaic cells 106 may be electrically coupled to a photoconductive device, such as a high bandwidth photodiode, that is configured to generate a data signal in response to the illumination by the coherent light 102 including the modulated optical signal and application of a reverse voltage bias thereto, such as described in U.S. Provisional Patent Application Ser. No. 62/234,302 filed Sep. 29, 2015, in the United States Patent and Trademark Office, the disclosure of which is incorporated by reference herein in its entirety.

The receiver 100b further includes a charging circuit 111 coupled to the output of the photovoltaic cells 106, which is configured to provide the power generated thereby to a battery, such as a battery of a portable or wearable consumer electronic device. The receiver 100b also includes a receiver controller 116 coupled to the charging circuit 111 and a proximity feedback circuit 121. The receiver circuit 116 may be a microprocessor device or other microcontroller that is configured to control operation of the charging circuit 111 and the proximity feedback circuit 121, which may be collectively referred to herein as a receiver circuit. The proximity feedback circuit 121 is configured to output an authentication signal, such as a feedback signal, that is detectable by the proximity sensor circuit 120 of the transmitter 100a for detection of the presence and/or authentication of the receiver 100b. The receiver 100b may also be physically configured such that it can reach sufficiently close proximity to enable operation of the transmitter 100a when the two are physically positioned in a particular relative orientation. For example, a housing of the receiver 100b may be configured to receive asymmetrically positioned matching pins of the transmitter 100a, which can impose the desired physical positioning of the receiver 100b.

Figure 2A:
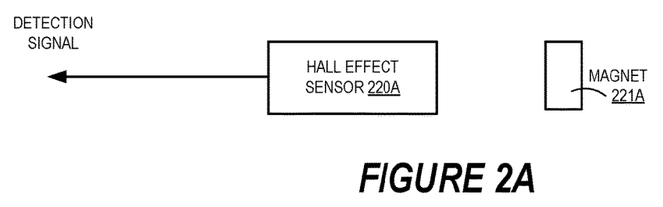
FIGS. 2A-2C are diagrams illustrating possible transmitter and receiver proximity sensor devices configured to provide safety features in accordance with some embodiments of the present disclosure.
Figure 2B:
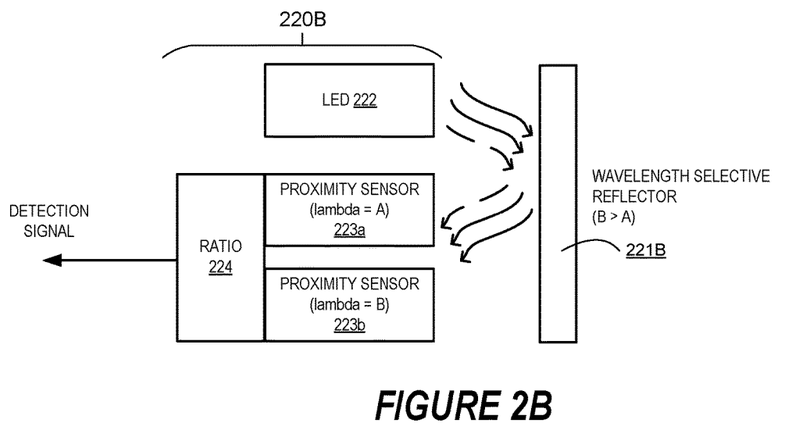
Figure 2C:
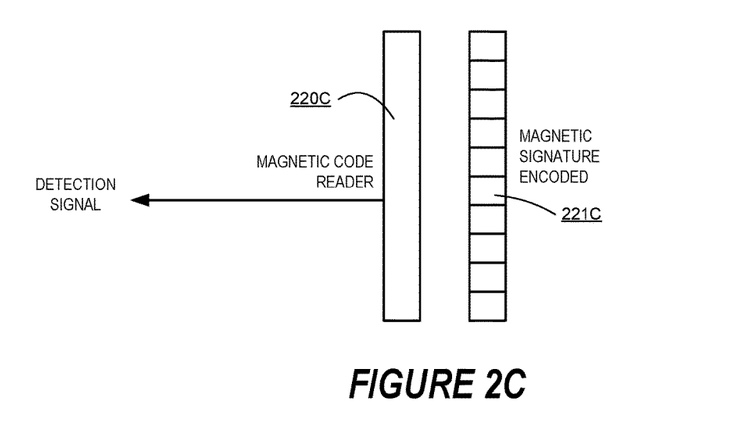

FIGS. 2A-2C are diagrams illustrating proximity sensor devices that may be used to implement the proximity sensor circuit 120 and the proximity feedback circuit 121 of FIG. 1A in accordance with some embodiments of the present disclosure. The operation of the proximity sensor circuit 120 and the proximity feedback circuit 121 can be based on one or more different options. For example, as shown in FIG. 2A, a magnetic proximity sensor circuit in the transmitter 100a may include a Hall-effect sensor 220A, and the proximity feedback circuit in the receiver 100b may include a magnet 221A. The Hall-effect sensor 220A may be configured to output a detection signal in response to detection of a magnetic field of the magnet 221A, which may be used by the transmitter circuit to determine a presence of and/or to authenticate the identity of the receiver 100b.

Additionally or alternatively, as shown in FIG. 2B, an optical proximity sensor circuit 220B in the transmitter 100a may include a light emitting diode (LED) 222 that is configured to emit light, and wavelength-specific proximity sensors 223a, 223b that are configured to detect reflection of the light emitted from the LED 222. The proximity feedback circuit in the receiver 100b may include a wavelength-selective reflector 221B, which includes wavelength-specific reflection regions that are configured to respectively reflect light of particular wavelengths within the light emitted from the LED 222. The orientation of the wavelength-selective reflector 221B relative to the wavelength-specific proximity sensors 223a, 223b may thus be used to detect the relative orientations of the housings of the transmitter 100a and the receiver 100b. In particular, the proximity sensor circuit 220B may be configured to output a detection signal to the transmitter controller 115 based on a ratio 224 of the amount of the LED light detected by the proximity sensor 223a responsive to reflection by the wavelength-specific reflector 221B, relative to the amount of the LED light detected by the proximity sensor 223b responsive to reflection by the wavelength-specific reflector 221B, which is affected by the relative orientation between the wavelength-specific reflection regions of the reflector 221B and the proximity sensors 223a, 223b. As such, the proximity feedback circuit 121 in the receiver 100b may be operated responsive to operation of the proximity sensor circuit 120 of the transmitter 100a.

In the embodiment of FIG. 2B, stringent proximity limits can be established by requiring the reflected intensity of the light output from the LED 222 to meet particular requirements. Further embodiments may use the light source 105 of the transmitter circuit as the LED 222 of the proximity sensor circuit 120, by operating the light source at a sub-threshold current below the lasing threshold, such that the light source 105 emits light as an LED. As such, the proximity feedback circuit 121 in the receiver 100b may be operated responsive to the incoherent light 102 emitted by the light source 105. In other words, the light source 105 can function to charge a photovoltaic cell when operated to emit coherent light in the presence of the receiver 100b, and can also function to align the transmitter 100a and receiver 100b when operated to emit incoherent light in the absence of the receiver 100b. In yet other embodiments, the proximity sensors 223a, 223b may operate responsive to receipt of ultrashort pulses of coherent light 101 from the light source 105 as reflected by the reflector 221B, to thereby check to see whether the receiver 100b is present.

Still referring to FIG. 2B, in order to authenticate the identity of the receiver 100b, transmitter circuits in accordance with some embodiments of the present disclosure can operate the LED 222 or light source 105 such that the reflected light from the reflector 221B is encoded temporally and/or spectrally. The temporal encoding can be accomplished, for example, by using amplitude shift keying (ASK), or similar methods to encode a bitstream onto the light emitted by the proximity sensor LED 222 or 105 (similar to the codes used for wireless entry to automobiles). Spectral encoding can be added to the temporal encoding, or implemented alternatively, whereby the spectral encoding may be implemented by the design of the wavelength selective reflector 221B, which can be configured to reflect one or more portions of the wavelength spectrum more strongly than others. Placement of multiple detectors 223a, 223b with specific wavelength sensitivity in the housing or body of the transmitter 100a may allow the particular spectral "fingerprint" of the reflected signal to be detected. In such a way, the reflected spectrum provided by the reflector 221B can be encoded instead of or in addition to the temporal amplitude-shift keying (ASK) code of the LED emission from the LED 222 or light source 105 operated at subthreshold current. Some embodiments can implement further encoding by use of specially designed microspheres in the reflector 221B, which exhibit whispering gallery mode spectral properties. These microspheres may be configured to scatter and reflect light in a way that provides a unique spectral fingerprint. Further embodiments can create a particular hologram in the receiver 100b for proximity feedback, which creates a holographic signature that is detected by the proximity sensors of the transmitter 100a. Other embodiments may include still other methods for determining the unique identity of the receiver unit.

As shown in FIG. 2C, further embodiments for authentication encoding may associate a particular magnetic fingerprint with the receiver 100b using a series of micro-sized magnetic dipoles 221C encoded with a magnetic signature. A magnetic code reader 220C in the transmitter 100a may identify the presence the receiver 100b based on this sequence of magnetic pole orientations, as indicated by the proximity and orientation of the housing of the receiver 100b including the magnetic dipoles 221C therein relative to the orientation of the housing of the transmitter 100a including the magnetic code reader 220C therein. The magnetic code reader 220C may thus output the detection signal to the transmitter controller 115 only in response to detection of this sequence of magnetic pole orientations.

Although illustrated in FIGS. 2A-2C with reference to specific devices that may be used to implement the proximity sensor circuit 120 and the proximity feedback circuit 121 of FIG. 1A, it will be understood that embodiments of the present disclosure are not limited thereto, and that other devices may be used to implement the proximity detection described herein. For example, some embodiments may include RFID tags and/or temperature sensors in the transmitter 100a and/or receiver 100b to detect the close proximity of the receiver 100b. Also, although described primarily herein with reference to active components as the proximity sensor devices in the transmitter 100a and passive components as proximity feedback devices in the receiver 100b, it will be understood that the receiver 100b can likewise include active components that are configured to detect the presence of the transmitter 100a prior to transmitting the feedback signal or other authentication signal from the receiver 100b.

Figure 3:
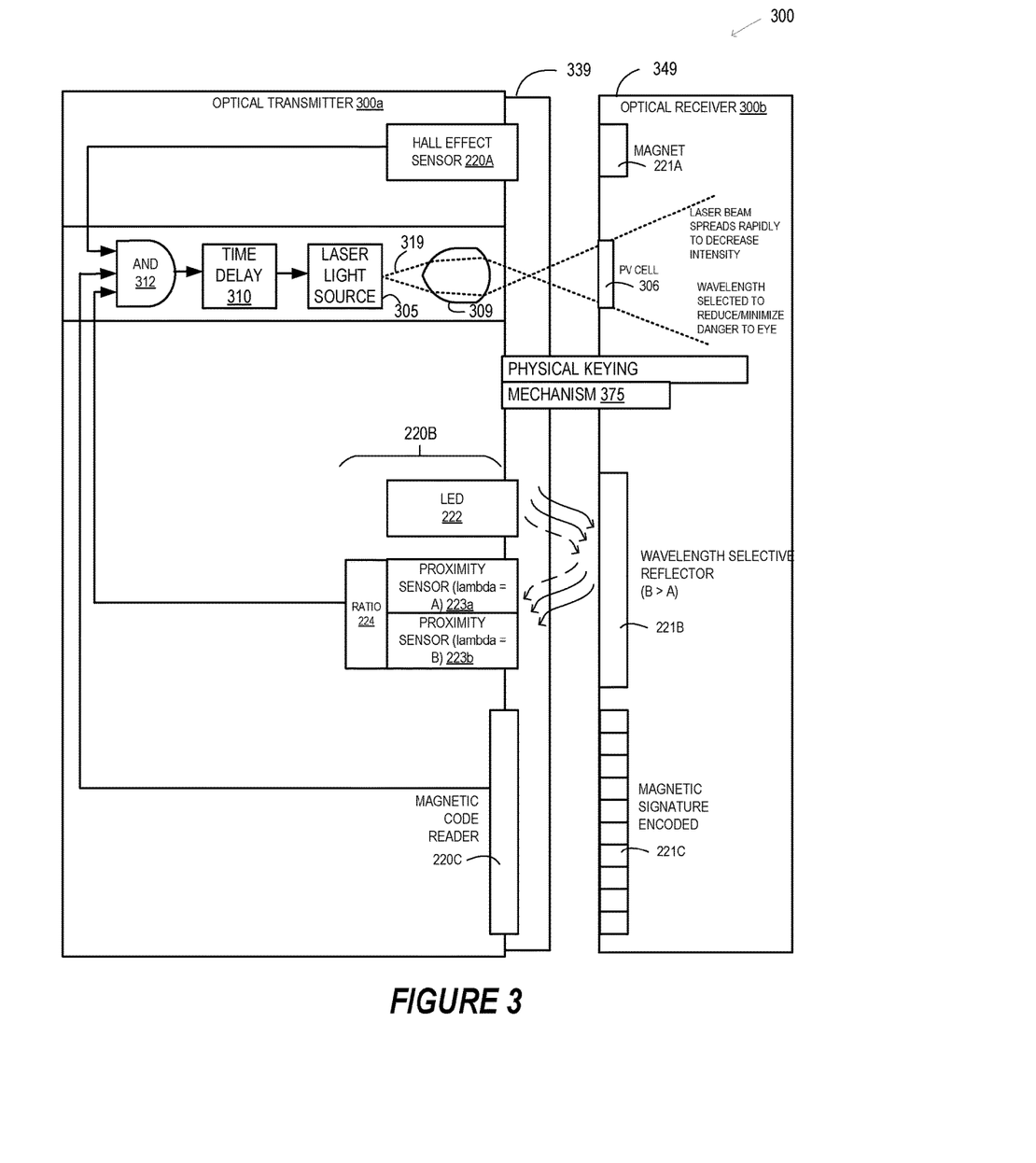
FIG. 3 is a diagram of an embodiment of a transmitter and receiver of an optical power transfer device including a combination of multiple safety features in accordance with some embodiments of the present disclosure.

FIG. 3 illustrates an optical power transfer device 300 in accordance with some embodiments of the present disclosure, which implements a combination of multiple different safety functionalities described herein. In the embodiment of FIG. 3, the optical transmitter 300a includes a laser light source 305 that is configured to emit a laser beam 319 in the infrared (IR) wavelength range by way of example. An optical system (illustrated as a lens 309) is used to focus the laser beam 319 at a focal point within a housing 339 of the transmitter 300a, so that physical access to the high intensity focus is denied to the outside world. That is, a short focal length lens 309 to focus the laser beam 319 within the housing or body 339 of the transmitter 300a (e.g., inside the transmitter 300a), such that the laser beam 319 diverges rapidly beyond. The laser beam 319 is thus not focused outside the transmitter housing 339 or otherwise in the environment. As a result, the laser beam 319 may be rapidly diverging and decreasing in intensity such that its capacity to injure may be greatly diminished at macroscopic distances from the transmitter 300a. The laser light source 305 is otherwise operable in a manner similar to the light source 105 of FIG. 1, in that the laser light source 305 is operable to emit coherent light 319 in response to a current greater than a lasing threshold that is provided thereto based on the presence and authentication of the optical receiver 300b, and is operable to emit incoherent light in response to a subthreshold current provided thereto in the absence of or failure to authenticate the optical receiver 300b.

The transmitter 300a also contains multiple proximity sensor circuits 220A, 220B, and 220C, each of which is configured to detect the presence of and/or authenticate the identity of the optical receiver 300b based on the proximity feedback circuits 221A, 221B, and 221C included in the receiver 300b, in a manner similar to that described above with reference to FIGS. 2A, 2B, and 2C, respectively. However, in the device 300 of FIG. 3, respective detection signals from each of the proximity sensor circuits 220A, 220B, and 220C are used in combination (illustrated by AND gate 312) to control operation of the laser light source 305 to emit the coherent laser beam 319. That is, the transmitter 300a in the embodiment of FIG. 3 is configured to control the laser light source 305 to emit the coherent laser beam 319 responsive to receiving respective proximity detection signals from each of the proximity sensor circuits 220A, 220B, and 220C. The transmitter 300a is otherwise configured to control the laser light source 305 to emit incoherent light, or to turn off the laser light source 305, in the absence of any one of the respective detection signals.

The optical receiver 300b also includes one or more photovoltaic cells 306 that are configured to generate electrical current or power responsive to illumination by the coherent laser beam 319. The photovoltaic cell(s) 306 may be similar to any of the photovoltaic cells 106 described above with reference to FIG. 1A, and may be sized and positioned in the housing 349 of the receiver 300b based on the focal length of the lens 309 and the physical mating requirements of the transmitter housing 339 with the receiver housing 349. The device 300 is configured such that the housings 339, 349 can be positioned sufficiently close to enable the transmitter 300a when the housings 339, 349 are physically aligned and oriented in a single, unique position relative to one another. In particular, the transmitter 300a and the receiver 300b include a physical keying mechanism (illustrated as asymmetrically positioned matching pins 375) that can impose the desired relative physical positioning of the transmitter and receiver housings 339 and 349; however, other physical keying mechanisms may also be used.

In the transmitter 300a of FIG. 3, additional safety may be provided by an analog or digital circuit 310 which implements a time delay between the moment at which some or all safety requirements have been met (i.e. proximity, authentication, etc.) based on the output of the AND gate 312, and the moment when the laser light source 305 is provided with current above the lasing threshold for emission of the coherent laser beam 319. The time delay provided by the circuit 310 for switching the laser to emit coherent light 319 can be augmented by a slow or delayed ramp in power to the laser light source 305.

Figure 4:
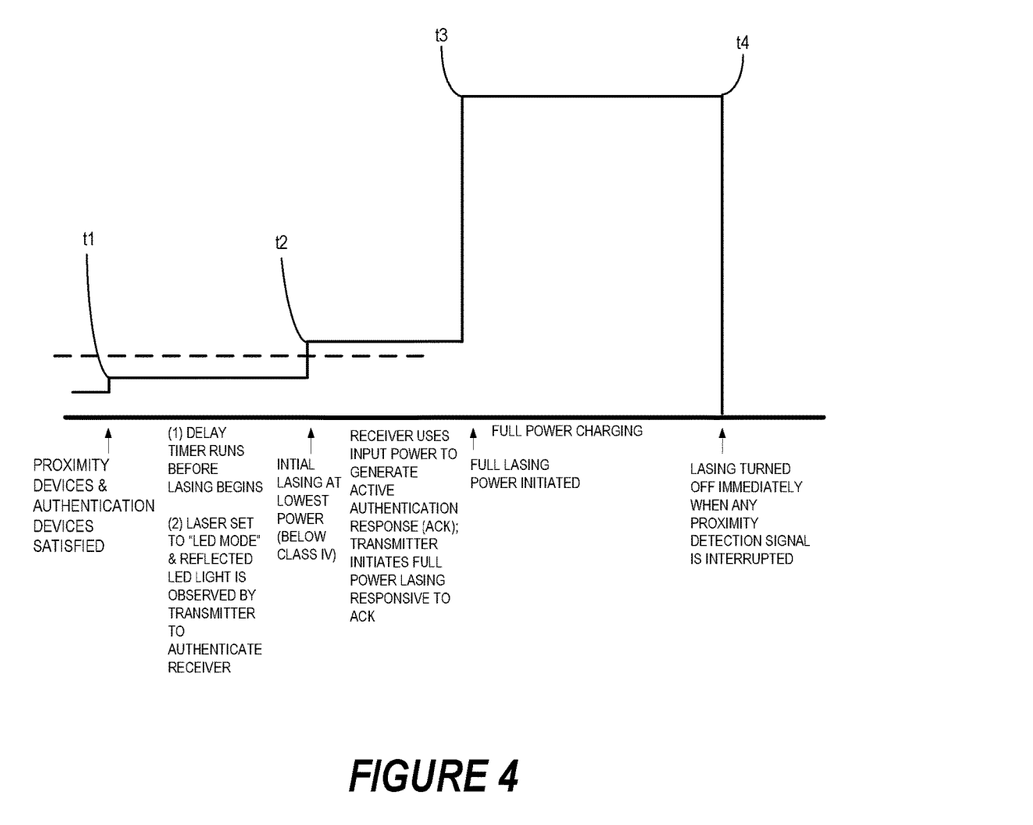
FIG. 4 is a diagram of an embodiment of a "slow turn on" feature to enhance safety of laser use in accordance with some embodiments of the present disclosure.

Example operation of the time delay circuit 310 of FIG. 3 is illustrated with reference to the diagram of FIG. 4, which illustrates a "slow turn on" concept to enhance safety of laser use in consumer electronics devices. As shown in FIG. 4, once initial proximity and authentication requirements for the receiver have been satisfied (e.g., responsive to receipt of at least some of the detection signal(s) from the proximity sensor circuits 220A, 220B, and 220C) at time t1, the time delay circuit 310 delays the drive signal to the laser light source 305 by a predetermined or desired amount of time, that is, until time t2. Between time t1 and time t2, the laser light source 305 may be operated in "LED mode," that is, to emit incoherent light. This incoherent light output from the laser light source 305 may nevertheless be sufficient for reflection by a proximity feedback device, to provide further authentication of the receiver 300b. That is, the laser light source 305 may function not only to charge the photovoltaic cell(s) 306 in the receiver housing 349 when the receiver 300b is detected and authenticated (i.e., by emitting the laser beam 319 in laser mode; between time t3 and time t4), but also to align the transmitter housing 339 and the receiver housing 349 when the receiver 300b is not detected or authenticated (i.e. by emitting incoherent light in LED mode; between time t1 and t2).

After the delay, at time t2, the current to the laser light source 305 is controlled such that the laser light source 305 is switched on at a relatively low power (sub-Class IV), which may not be acceptable for charging performance, but may be sufficient to energize a proximity feedback circuit in the receiver 300b (for example, an LED or an RF antenna), as an additional indicator of presence and/or authentication. That is, the laser light source 305 of the transmitter 300a may be operated in the low-power mode (between time t2 and time t3) to power a further authentication operation by the receiver 300b. As such, in some embodiments, the laser light source 305 may be operated in 3 distinct modes (i.e., LED mode from t1 to t2; low-power mode from t2 to t3; and full-power laser mode from t3 to t4), to provide 3 different functions (i.e., alignment from t1 to t2; receiver feedback/authentication from t2 to t3; and optical charging from t3 to t4).

After the active component of the receiver 300b is energized and switched on to provide this additional feedback signal, the transmitter 300a may further increase the power of the signal to the laser light source 305. In particular, if the additional response or acknowledgment (ACK) signal from the receiver 300b is received by the transmitter 300b, the transmitter 300a increases the current to the laser light source 305 above the lasing threshold, such that full lasing power is initiated at time t3. Full power charging may thus continue until the response/ACK signal from the receiver 300b is interrupted or is otherwise not received by the transmitter 300a, illustrated at time t4. Upon interruption of this feedback signal from the receiver 300b at time t4 (or at any time), the power to the laser light source 305 may be switched off (or may be switched below the lasing threshold), and an error signal may be generated to ask the user to re-attach the receiver 300b again. As such, in the example of FIG. 4, operations of the proximity sensors 220A, 220B, and 220C, the proximity feedback devices 221A, 221B, 222C, and the time delay circuit 310 may be combined to provide multiple levels of authentication and delay before coherent light output from the laser light source 305 is enabled.

Further aspects of the present disclosure that may confer safety include the close/tight packing of all proximity detection optical charging components into a physical area or configuration that may be difficult for a consumer to replicate, as shown in the optical transmitter 300a and optical receiver 330b of FIG. 3. In other words, the design and/or configuration of elements can present a significant barrier to would-be spoofing efforts or other attempts to integrate all of the numerous sensors into the required physical configuration. In this way, the use of multiple layers of safety as shown in FIG. 3 can achieve a synergistic improvement in safety that may exceed the safety level provided by the sum of each individually.

Figure 5:
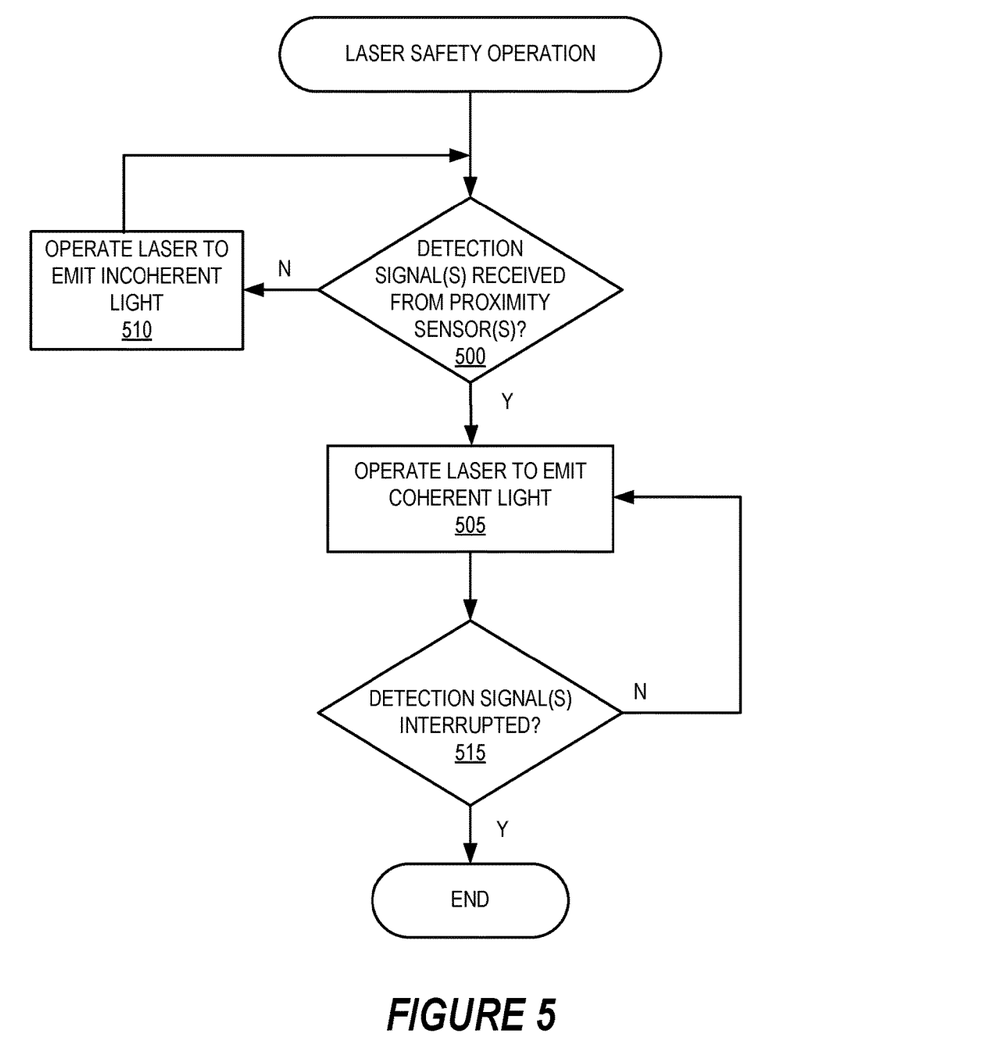
FIGS. 5-6 are flowcharts illustrating operations performed by devices and apparatus described herein to provide safety features in accordance with some embodiments of the present disclosure.
Figure 6:
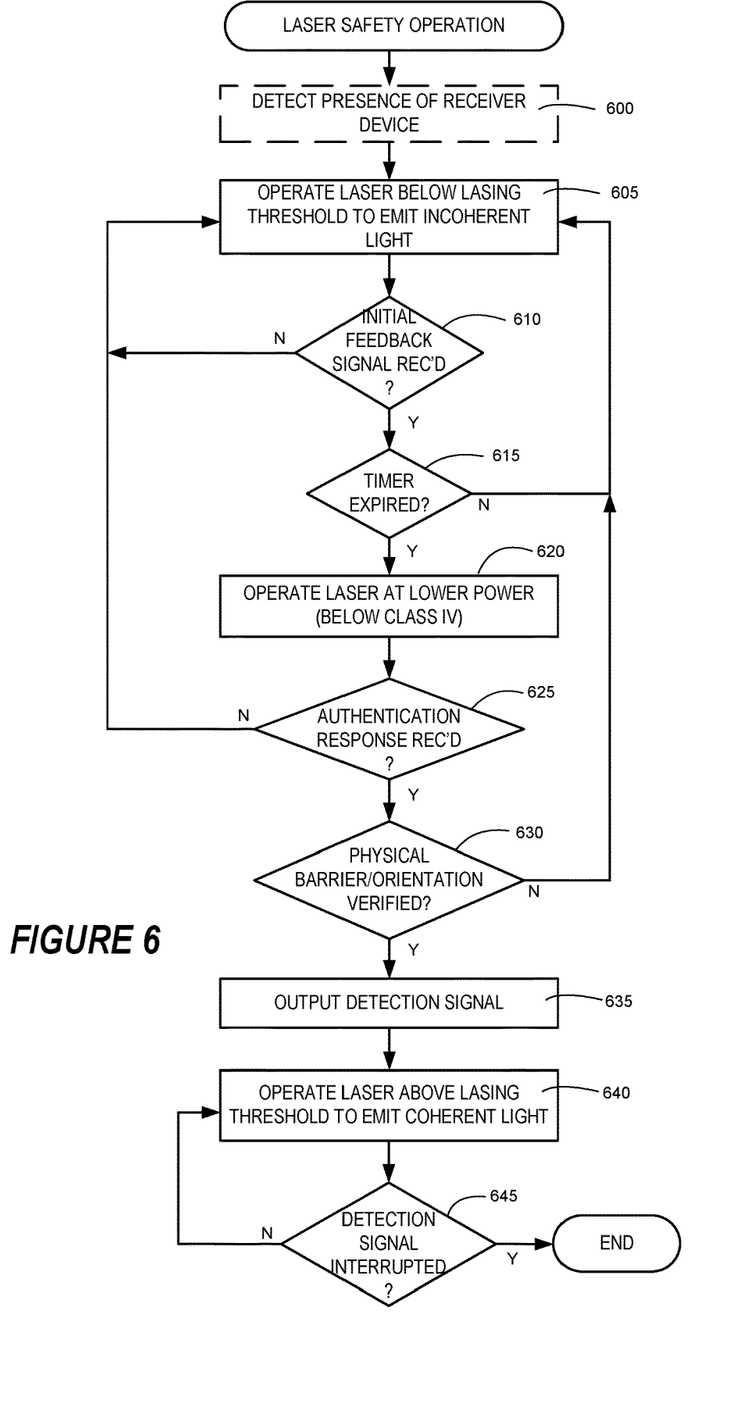

FIGS. 5 and 6 are flowcharts illustrating methods for operating optical power transmitter devices, such as the devices 100a and 300a of FIGS. 1A and 3, in accordance with some embodiments of the present disclosure. Although illustrated in FIGS. 5 and 6 with reference to the operations in a particular order, it will be understood that operations in accordance with embodiments of the present disclosure may occur in a different order than those shown. As shown in FIG. 5, operations begin at block 500 by determining whether one or more detection signals have been received from one or more proximity sensor circuits, such as the proximity sensor circuits 220A, 220B, and/or 220C of FIGS. 2A-2C. The detection signals indicate the presence of and/or authenticate the identity of an optical receiver housing based on signals received from one or more proximity feedback circuits in the optical receiver, such as the proximity feedback circuits 221A, 221B, and/or 221C of FIGS. 2A-2C.

If it is determined that the detection signal or signals are received from the proximity sensor(s) at block 500, a current sufficient to operate a laser light source above a lasing threshold to emit coherent light is applied to the laser light source at block 505. One or more photovoltaic cells in the receiver housing may be configured to generate electrical current or power responsive to illumination by the coherent light output. If detection of one or more of the detection signals is interrupted at block 515, operation of the laser light source ends, for example, by interrupting current to the laser light source.

If it is determined that one or more of the detection signals are not received from the proximity sensor(s) at block 500, the laser light source is operated below the lasing threshold to emit incoherent light at block 510 such that coherent light output is prevented, for example, by applying a subthreshold current to the laser light source. The subthreshold current is insufficient to operate the laser light source to emit coherent light, but is sufficient to operate the laser light source to emit incoherent light. As such, the laser light source is operated to emit incoherent light at block 510 in the absence of the detection signals (or other failure to detect the presence and/or authenticate the identity of) the receiver at block 500.

FIG. 6 illustrates example operation of a transmitter circuit, such as the circuit 300a FIG. 3 in greater detail. Referring now to FIG. 6, responsive to detection of the presence of an optical receiver at block 600 (or in the absence of detection signals from one or more proximity sensor circuits therein), a laser light source of the transmitter circuit is operated at a subthreshold current or otherwise below the lasing threshold such that incoherent light is emitted therefrom at block 605. Responsive to operation of the laser light source to emit the incoherent light, it is determined whether an initial feedback signal is received from the optical receiver at block 610. The initial feedback signal may be a reflection of the incoherent light by one or more elements of the receiver housing in some embodiments.

Upon receipt of the initial feedback signal at block 610 and expiration of a delay timer at block 615, the laser light source is operated in a lower power (below Class IV operation) mode at block 620. The light output from the laser light source in low power mode operations at block 620 may be sufficient to energize a proximity feedback circuit in the optical receiver to generate and transmit an authentication response message (such as the ACK message of FIG. 4), but may not sufficient to charge a portable consumer electronic device coupled to the optical receiver. That is, the laser light source of the transmitter may be operated in the low-power mode to power a further authentication operation by the receiver.

Upon receipt of the authentication response signal from the optical receiver at block 625, it is determined whether the receiver housing is positioned at a desired orientation relative to the transmitter housing at block 630, for example, based on a physical keying and/or latching mechanisms in the transmitter and receiver housings that are adapted to mate with one another. For example, the transmitter housing may include at least one structure that is configured to position the transmitter housing at a desired orientation relative to the receiver housing. The presence of a physical barrier, which may be configured to block or otherwise prevent transmission of the laser light outside of the transmitter and receiver housings, may also be verified at block 630. If either the authentication verification at block 625 or the physical barrier/housing orientation verification at block 630 is unsuccessful, the laser light source is returned to subthreshold operation to emit incoherent light at block 605.

If both the authentication verification at block 625 and the physical barrier/housing orientation verification at block 630 are successful, a detection signal indicative of successful authentication of the optical receiver is output at block 635. In response, the laser light source is operated at an increased power level above the lasing threshold to emit full-power coherent light at block 640. Full power coherent light emission is continued until interruption of the detection signal at block 645. Upon interruption of the detection signal from the receiver at block 645, power to the laser light source may be switched off, or may be switched below the lasing threshold. In some embodiments, an error signal may be generated to ask a user to check the mechanical connection between the transmitter and receiver housings.

As such, the laser light source may function not only to charge the photovoltaic cell(s) in the optical receiver in full-power laser mode at block 640, but also to align the transmitter housing and the receiver housing prior to authentication of the receiver by emitting incoherent light in "LED mode" at block 605, and further to power the optical receiver to provide the authentication response in low-power mode at block 620.

As illustrated by way of the examples above, embodiments of the present disclosure can include any and all combinations of safety functionalities described herein. Examples of further embodiments may include, but are not limited to, the following.

Some embodiments may include designs that implement a delay circuit to delay turning on the laser after the presence of the receiver is detected. In some embodiments, an LED based proximity sensor may be used. In other embodiments, magnetic hall-effect sensors may be used. In still other embodiments, RFID tags may be used. More generally, some embodiments may combine the delay circuit with one or more proximity sensors (including those described herein and/or elsewhere).

Some embodiments may include designs that implement a "slow turn on" mechanism in which the initial laser power is low (for example, below threshold for eye damage), and whereby the power is permitted to increase only if the receiver generates and communicates a unique signal (that can be authenticated by the transmitter) to indicate that the receiver is receiving power. In such embodiments, one or more of the proximity sensing concepts described herein may also be used.

Some embodiments may include any design which uses physical shape to "mate" or "key" the receiver housing to the transmitter housing such that proximity cannot be realized without the correct receiver housing. One example of such a "key" is the BNC connector on coaxial cables. In such a design, only the particular male and female ends are able to be connected. For coaxial cables, this can ensure that only matching cable types are able to be connected. In the embodiments described herein, though, such a design can also prevent a "false" or unauthorized receiver from coming into close proximity to the transmitter and enabling it, unless the receiver is a true or authorized receiver.

Some embodiments may use a convex or planoconvex lens to induce the light to focus (for example, within the transmitter housing) and then diverge rapidly. Other embodiments may use a concave lens design to cause the light to diverge. Still other embodiments may use a compound parabolic concentrator (CPC) to produce a source that diverges rapidly.

In some embodiments, the proximity and authentication devices may be configured to be within about 1 centimeter (cm) of one another for successful detection. In other embodiments, the proximity and authentication devices may be configured to be within about 2 millimeters (mm) of one another for successful detection. Such close physical proximity can add to and thus improve the strength of the safety features described herein, as a false receiver that could spoof the transmitter into turning on may not easily be fabricated.

The present disclosure has been described above with reference to the accompanying drawings, in which embodiments are shown. However, this disclosure should not be construed as limited to the embodiments set forth herein. Rather, these embodiments are provided so that this disclosure will be thorough and complete, and will fully convey the scope of the present disclosure to those skilled in the art. In the drawings, the thickness of layers and regions are exaggerated for clarity. Like numbers refer to like elements throughout.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. In no event, however, should "on" or "directly on" be construed as requiring a layer to cover an underlying layer.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used in the description herein is for the purpose of describing particular embodiments only and is not intended to be limiting of the present disclosure. As used in the description herein and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, the regions illustrated in the figures are schematic in nature and their shapes are not intended to illustrate the actual shape of a region of a device and are not intended to limit the scope of the present disclosure.

Unless otherwise defined, all terms used in disclosing embodiments, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entireties.

Aspects of the present disclosure are described herein with reference to flowchart illustrations and/or block diagrams of methods and systems according to embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

Although the invention has been described herein with reference to various embodiments, it will be appreciated that further variations and modifications may be made within the scope and spirit of the principles of the present disclosure. Although specific terms are employed, they are used in a generic and descriptive sense only and not for purposes of limitation, the scope of the present disclosure being set forth in the following claims.

That which is claimed:

1. An optical power transfer device, comprising:
   a transmitter circuit comprising a laser light source configured to emit coherent light responsive to operation above a lasing threshold thereof, and to emit incoherent light responsive operation below the lasing threshold; and
   a proximity sensor circuit coupled to the transmitter circuit and configured to output a detection signal indicative of an optical receiver within a proximity thereof, the optical receiver comprising at least one photovoltaic cell having a surface area of about 4 square millimeters or less that is configured to generate electric current responsive to illumination by the coherent light,
   wherein the transmitter circuit is configured to operate the laser light source below the lasing threshold to emit the incoherent light responsive to an absence of the detection signal from the proximity sensor circuit.

2. The device of claim 1, wherein the proximity sensor circuit is configured to receive a feedback signal from the optical receiver responsive to operation of the laser light source to emit the incoherent light.

3. The device of claim 2, wherein the proximity sensor circuit is configured to perform authentication of the optical receiver responsive to receipt of the feedback signal and prior to output of the detection signal.

4. The device of claim 3, wherein the feedback signal comprises an optical signal, wherein the proximity sensor circuit comprises an optical detector that is configured to detect temporal and/or spectral encoding in the optical signal, and wherein the proximity sensor circuit is configured to perform the authentication of the optical receiver based on the temporal and/or spectral encoding in the optical signal.

5. The device of claim 4, wherein the proximity sensor circuit further comprises an optical emitter configured to emit an optical proximity signal, and wherein the feedback signal comprises a reflection of the optical proximity signal.

6. The device of claim 4, wherein the feedback signal comprises a reflection of the incoherent light.

7. The device of claim 3, wherein the coherent light has a full lasing output power of about 500 milliwatts or more, and wherein the transmitter circuit is configured to operate the laser light source above the lasing threshold but below the full lasing output power to emit lower-power coherent light upon expiration of a time delay after receiving the feedback signal.

8. The device of claim 7, wherein the proximity sensor circuit is configured to receive an authentication response signal from the optical receiver responsive to operation of the laser light source to emit the lower-power coherent light, and wherein the proximity sensor circuit is further configured to perform authentication of the optical receiver responsive to receipt of the authentication response signal.

9. The device of claim 8, wherein the incoherent light or the lower-power coherent light is configured to energize the optical receiver to generate the feedback signal or the authentication response signal, respectively.

10. The device of claim 4, wherein the feedback signal comprises a first feedback signal, and wherein the proximity sensor circuit further comprises:
a magnetic sensor configured to detect a magnetic field component of a second feedback signal from the optical sensor,
wherein the proximity sensor circuit is further configured to perform the authentication of the optical receiver responsive to receipt of the first feedback signal and the second feedback signal.

11. The device of claim 10, wherein the second feedback signal comprises a sequence of magnetic pole orientations corresponding to magnetic dipoles within the optical receiver.

12. The device of claim 3, further comprising:
a transmitter housing including the transmitter circuit and the proximity sensor circuit therein, wherein the transmitter housing comprises an aperture including the laser light source therein; and
a lens element within the aperture and optically coupled to the laser light source, wherein a focal point of the lens element is within the transmitter housing.

13. The device of claim 12, wherein the lens element is configured to provide divergence beyond the focal point such that, responsive to operation of the laser light source to emit the coherent light, an intensity of the coherent light decreases with distance from the aperture.

14. The device of claim 12, wherein the transmitter housing comprises at least one structure that is configured to position the transmitter housing at a desired orientation relative to a receiver housing comprising the optical receiver, wherein the desired orientation positions the proximity sensor circuit to receive the feedback signal.

15. The device of claim 2, wherein the coherent light comprises a wavelength of about 1400 nm to about 1700 nm or more, and/or comprises a temporal profile configured to provide continuous radiation.

16. The device of claim 1, wherein the at least one photovoltaic cell comprises a stack of photovoltaic cells that collectively provide a voltage that is greater than a photon energy of the illumination by the coherent light that is incident on one of the photovoltaic cells in the stack.

17. The device of claim 1, wherein the coherent light comprises a modulated optical signal, wherein the optical receiver further comprises a photoconductive diode electrically connected to the at least one photovoltaic cell, and wherein the photoconductive diode is configured to generate a data signal in response to the illumination by the coherent light comprising the modulated optical signal and application of a reverse bias voltage thereto.

18. A method of operating an optical power transfer device, the method comprising:
detecting, at a transmitter circuit comprising a laser light source configured to emit coherent light, a presence or absence of a detection signal output from a proximity sensor circuit, the detection signal indicating an optical receiver comprising at least one photovoltaic cell having surface area of about 4 square millimeters ($mm^2$) or less within a proximity thereof; and
operating the laser light source below a lasing threshold thereof to emit incoherent light therefrom responsive to detecting the absence of the detection signal from the proximity sensor circuit,
wherein the detecting and operating comprise operations performed by at least one processor.

19. The method of claim 18, further comprising:
receiving, at the proximity sensor circuit, a feedback signal from the optical receiver responsive to operating the laser light source to emit the incoherent light.

20. The method claim 19, further comprising:
performing, at the proximity sensor circuit, authentication of the optical receiver responsive to receiving the feedback signal and prior to output of the detection signal.

* * * * *